United States Patent [19]
Lindberg et al.

[11] Patent Number: 5,227,953
[45] Date of Patent: Jul. 13, 1993

[54] APPARATUS FOR RETAINING AND ELECTRICALLY INTERCONNECTING MULTIPLE DEVICES

[75] Inventors: Tom B. Lindberg; Sergey G. Podwalny, both of Corvallis, Oreg.

[73] Assignee: Hewlett-Packard Company, Palo Alto, Calif.

[21] Appl. No.: 780,661

[22] Filed: Oct. 18, 1991

[51] Int. Cl.⁵ .................. H05K 7/10; H01R 27/02; G06F 1/16
[52] U.S. Cl. .................................. 361/393; 361/380; 439/374; 439/638; 439/928
[58] Field of Search ............. 439/247, 248, 170, 374, 439/377, 638, 653, 654, 928, 929; 364/708; 361/380, 392, 393, 394, 395, 399

[56] References Cited

U.S. PATENT DOCUMENTS

| | | | |
|---|---|---|---|
| 4,493,524 | 1/1985 | Kaplan et al. | 364/708 X |
| 4,527,285 | 7/1985 | Kekas et al. | 439/928 X |
| 4,715,385 | 12/1987 | Cudahy et al. | 439/928 X |
| 4,736,332 | 4/1988 | Crease | 364/708 |
| 4,739,451 | 4/1988 | Kuba | 361/394 |
| 4,769,764 | 9/1988 | Levanon | 364/708 |
| 4,788,658 | 11/1988 | Hanebuth | 364/708 X |
| 4,790,431 | 12/1988 | Reel et al. | 361/394 X |
| 4,837,590 | 6/1989 | Sprague | 206/305 X |
| 4,896,776 | 1/1990 | Kabanuk et al. | 206/305 X |
| 4,941,841 | 7/1990 | Darden et al. | 364/708 X |
| 4,996,628 | 2/1991 | Harvey et al. | 361/393 |
| 5,002,497 | 3/1991 | Plocek et al. | 439/247 X |
| 5,020,090 | 5/1991 | Morris | 379/58 |
| 5,139,439 | 8/1992 | Shie | 364/708 X |

FOREIGN PATENT DOCUMENTS 2188495  9/1987  United Kingdom ............... 439/928

*Primary Examiner*—Leo P. Picard
*Assistant Examiner*—Michael W. Phillips

[57] ABSTRACT

A retaining apparatus includes a first compartment for removably receiving a portable computing device and a second compartment for removably retaining a peripheral device. A bulkhead between the two compartments includes electrical connectors for interconnecting such devices when mounted within their respective compartments. The compartments are preferably formed from a single enclosure to provide rigidity to the retaining apparatus. The bulkhead connectors are sized and shaped to connect to complementary connectors on the devices when the devices are slidably inserted into their compartments. Various openings and other connectors are also provided within the retaining apparatus to allow access to connectors, slots and other features of the devices while they are mounted therein. In addition, another electrical connector is provided in the bulkhead for enabling a peripheral device outside the apparatus to be connected to the computing device.

18 Claims, 5 Drawing Sheets

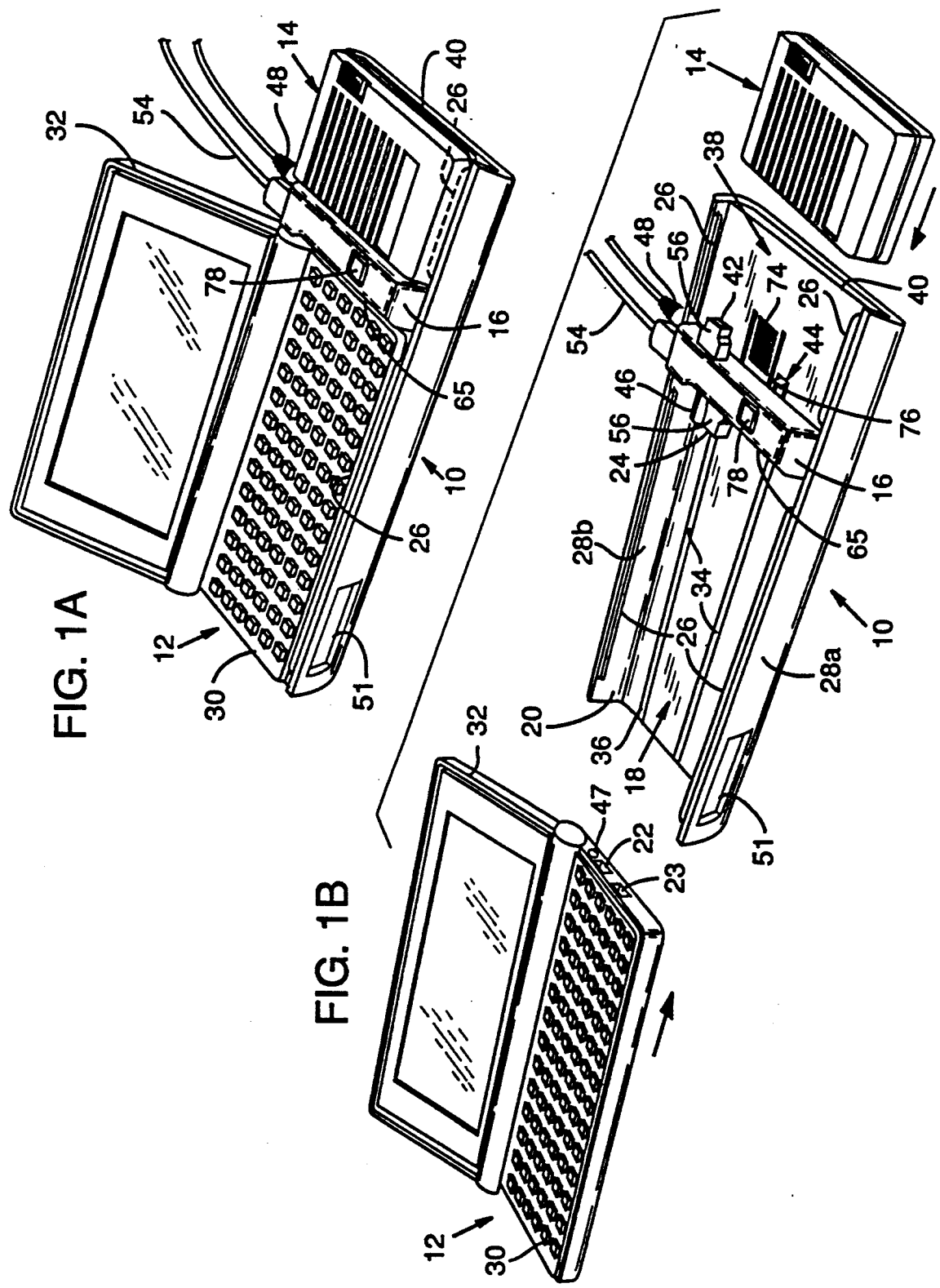

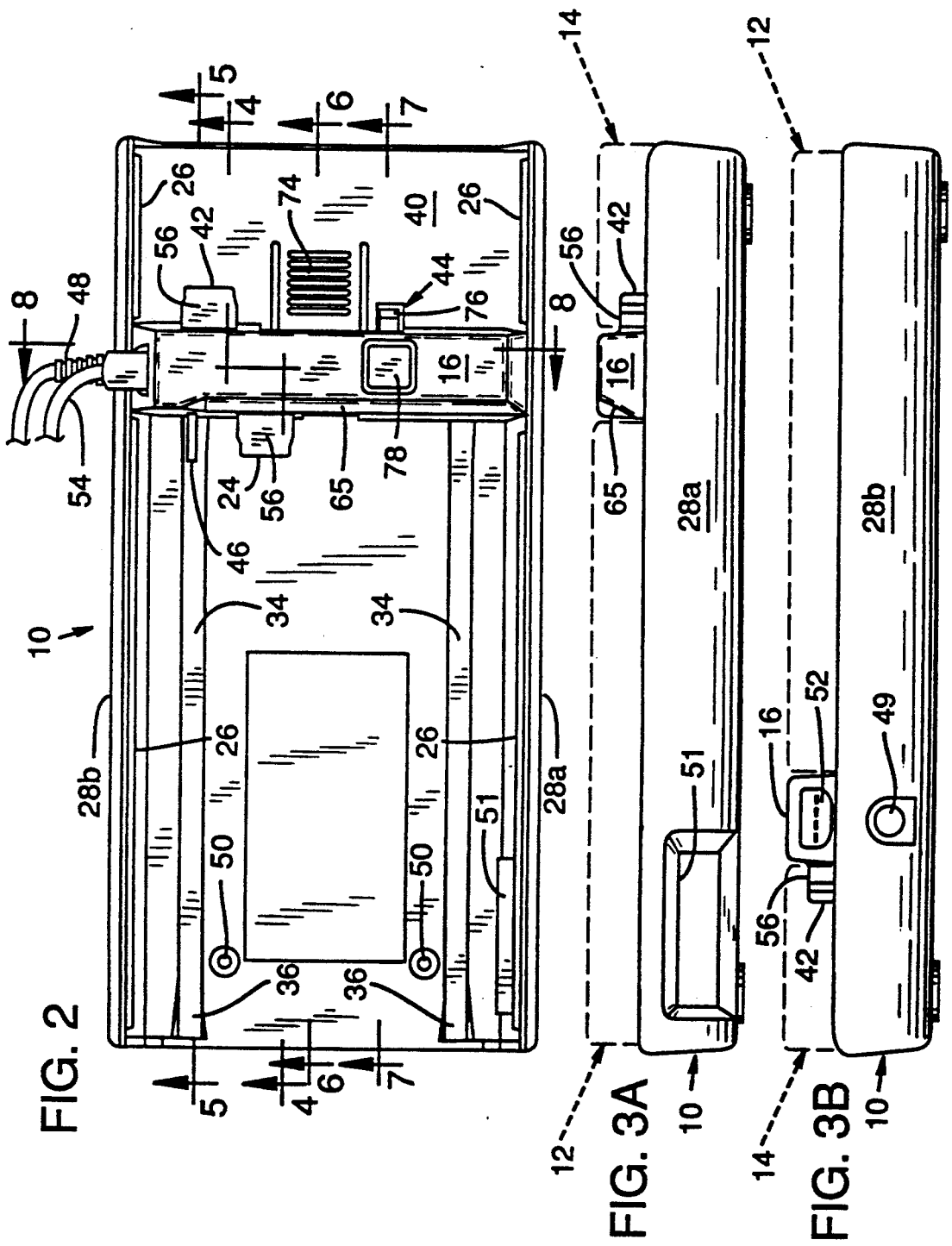

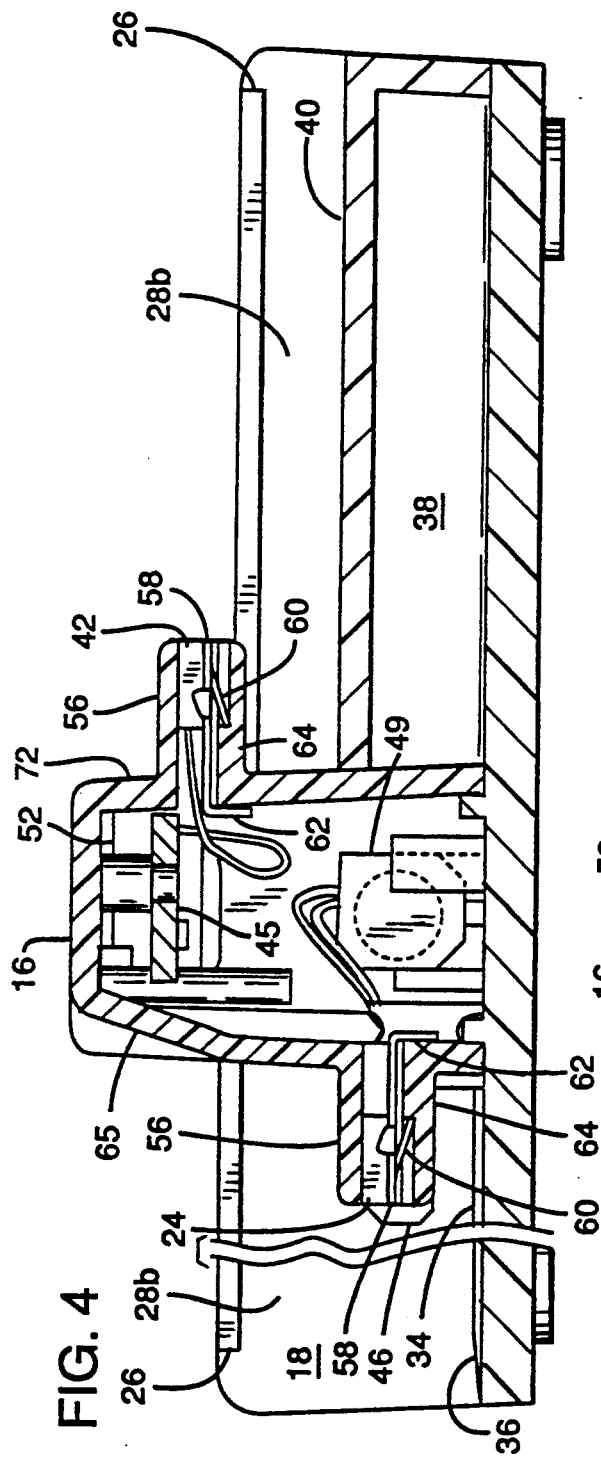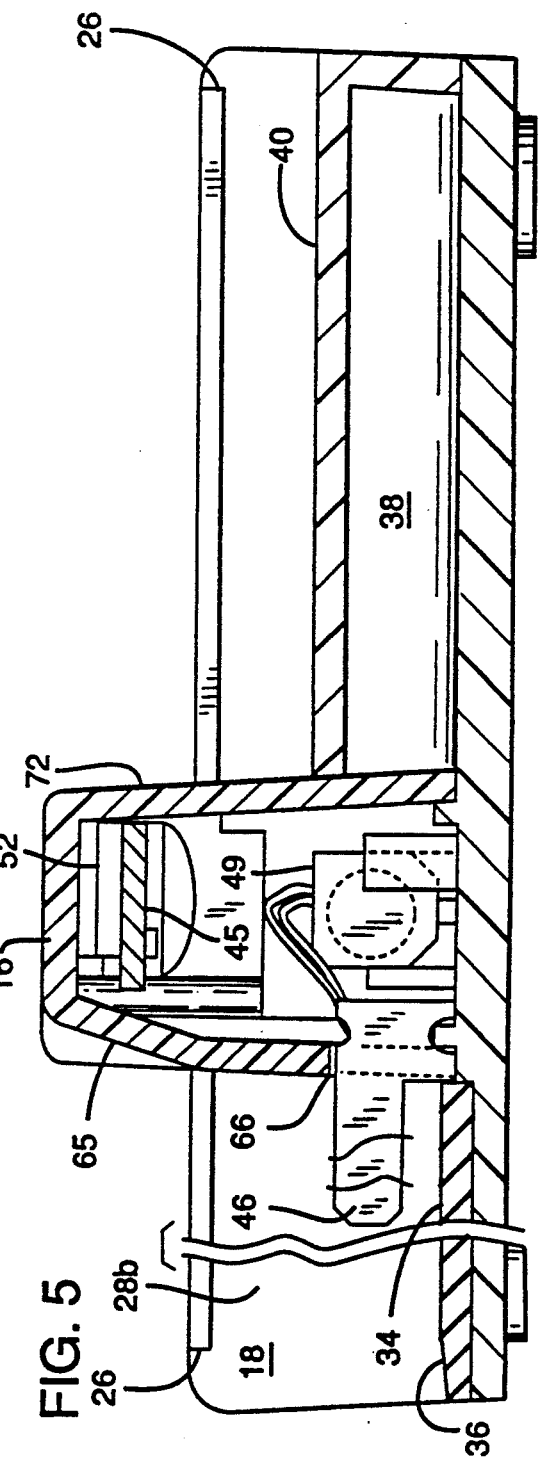

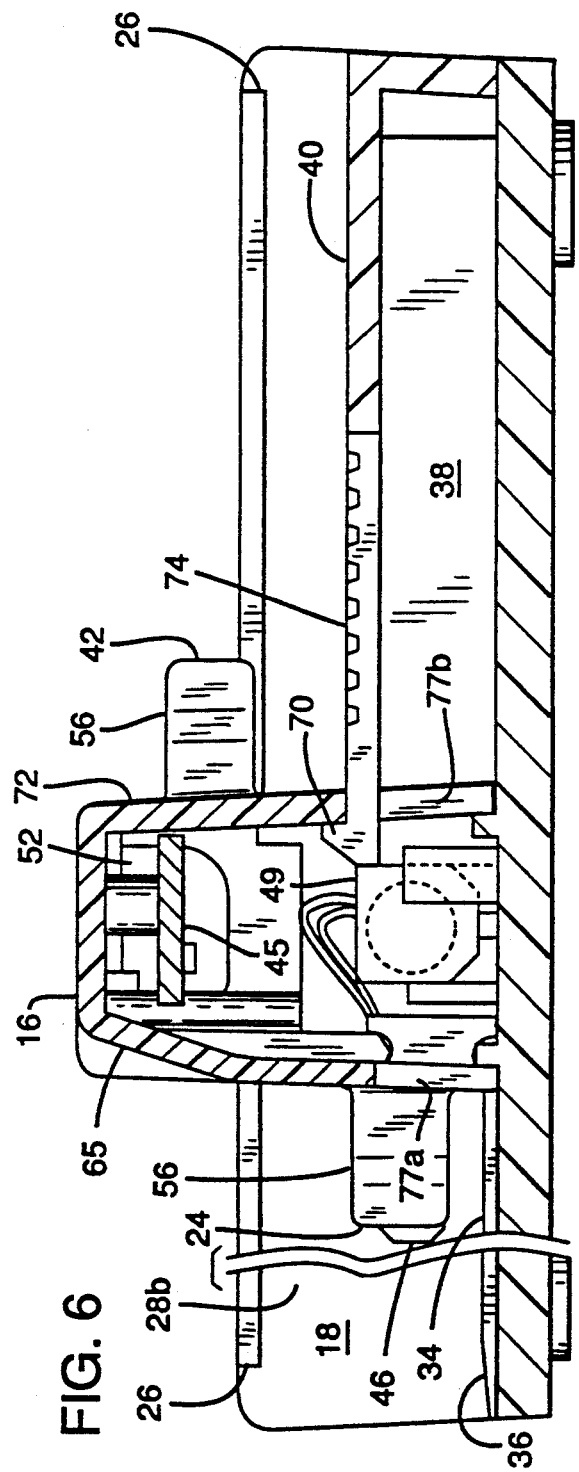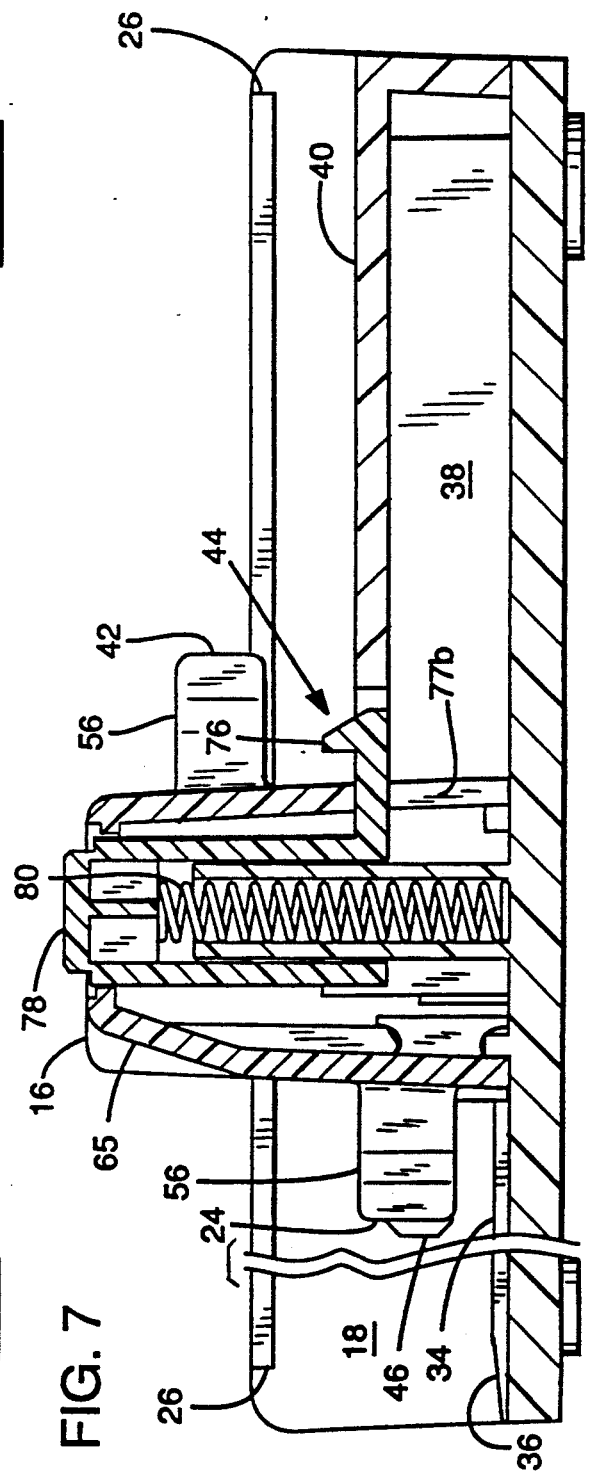

APPARATUS FOR RETAINING AND ELECTRICALLY INTERCONNECTING MULTIPLE DEVICES

BACKGROUND OF THE INVENTION

This invention relates to retaining apparatus and, more particularly, to apparatus for retaining and interconnecting a portable computing device and a peripheral device such as a modem, pager, or other accessory.

Portable computing devices such as calculators and notebook- or palm-sized computers are often used in conjunction with peripheral devices such as modems, printers and the like. Conventionally, such peripheral devices are connected to the portable computing device with an electrical cable. Although simple, this technique makes it difficult to compactly carry the devices and limits the portability of the computing system as a whole.

One approach to solving this problem is to plug the peripheral device directly into the computing device. This approach provides rigidity and compactness not possible with a cable connection. However, it has several disadvantages. It requires additional hardware on the devices to make the mechanical connection since standard, general purpose electrical connectors are not designed for such a connection. And the additional hardware likely would block or otherwise interfere with the operation of the standard electrical connectors on these devices such as serial ports and AC connectors.

A variation on the above approach is to connect the peripheral device to the computing device through a card port on those devices having such a port. This approach, however, interferes with the use of the card port for other purposes, such as memory expansion. It also is undesirable because of the long, thin shape required of the connector for connecting the peripheral device to the card port.

Another approach is to connect the devices with an electrical cable and then bundle the devices together in a pouch. This has the advantage of simplicity in design. But it is unwieldy, and it limits access to the several ports of the computing device for additional peripheral devices including the port occupied by the electrical cable.

SUMMARY OF THE INVENTION

An object of the invention, therefore, is to provide a retaining apparatus that connects a peripheral device and a portable computing device in a compact, convenient and highly portable manner without modifying or adding additional hardware to the devices.

Another object of the invention is to provide such a retaining apparatus that is shaped and otherwise designed so as to not interfere with the normal use of the computing device.

Yet another object of the invention is to provide such a retaining apparatus to which the computing device and peripheral device can be easily mounted and from which they can be easily removed.

To achieve these objects, a retaining apparatus in accordance with the invention includes a first compartment for removably retaining a portable computing device and a second compartment for removably retaining a peripheral device. A connecting unit electrically interconnects the two devices when mounted within their respective compartments. To allow a second peripheral device to be connected to the computing device, the connecting unit may contain an additional connector that also electrically interconnects to the computing device. With these multiple connectors, a small peripheral device that is used constantly with the computing device may be left mounted within the second compartment and a larger peripheral device that is used occasionally may be connected to the computing device as required.

The retaining apparatus includes other features designed to permit a user to readily mount a portable computing device therein and to preserve access to the various connectors, keys and other parts of the computing device.

The foregoing and other objects, features, and advantages of the invention will become more apparent from the following detailed description of a preferred embodiment which proceeds with reference to the accompanying drawings.

BRIEF DESCRIPTION OF THE DRAWINGS

FIGS. 1A-B are perspective views of a retaining apparatus according to the invention showing a portable computing device and peripheral device retained therein and removed therefrom.

FIG. 2 is a top plan view of the apparatus of FIG. 1.

FIGS. 3A-B are front and rear side views of the apparatus of FIG. 1.

FIG. 4 is a cross-sectional view of the apparatus taken along line 4—4 in FIG. 1.

FIG. 5 is a cross-sectional view of the apparatus taken along line 5—5 in FIG. 1.

FIG. 6 is a cross-sectional view of the apparatus taken along line 6—6 in FIG. 1.

FIG. 7 is a cross-sectional view of the apparatus taken along line 7—7 in FIG. 1.

DETAILED DESCRIPTION OF A PREFERRED EMBODIMENT

Figure 8:
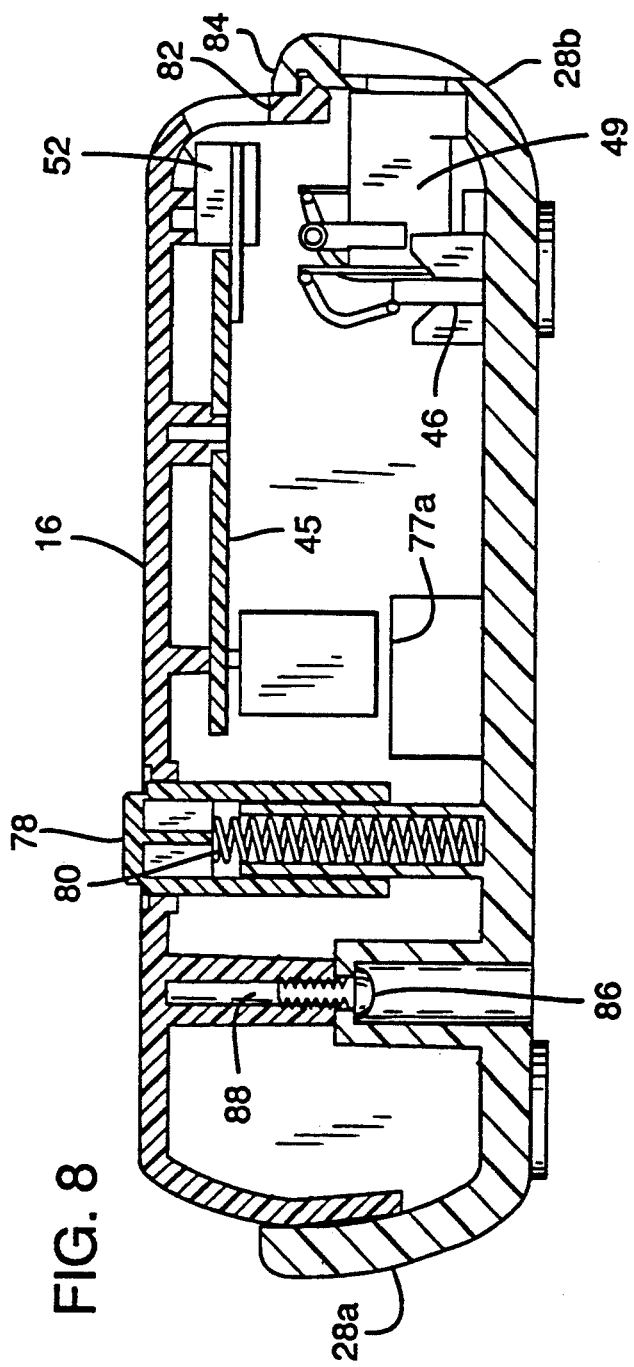
FIG. 8 is a cross-sectional view of the apparatus taken along line 8—8 in FIG. 1.

FIGS. 1A and 1B are perspective views of a retaining apparatus 10 according to the invention, made of a resilient material such as a plastic. In FIG. 1A, a portable computing device 12 is shown rigidly and securely retained within one compartment of the apparatus 10 and a peripheral device 14 such as a pager is shown similarly retained within a second compartment thereof. The computing device 12 and peripheral device 14 are electrically interconnected through a connecting unit such as a cable or, in the present embodiment, a bulkhead 16 mounted between the two compartments of a single enclosure. Such electrical interconnection may be by wire or optically with electromagnetic energy such as visible light, infrared light, etc. The apparatus 10 retains the devices 12 and 14 therein in such a manner that they are easily transportable without concern that the connection between them will break. And as shown in FIG. 1A and discussed with respect to subsequent figures, the apparatus 10 is constructed to allow access to the AC connector and serial port of the computing device 12 while retained within the apparatus. As is also described, the bulkhead 16 is constructed for positioning the computing device 12 to communicate with the peripheral device 14 with both devices retained within the apparatus 10.

FIG. 1B shows more clearly the parts of the retaining apparatus 10 with the computing device 12 and peripheral device 14 removed therefrom. A first compartment 18 is sized and shaped for removably retaining the computing device 12. It should be understood that the exact size and shape of the compartment 18 is dictated by the size and shape of the computing device 12 to be used therewith. Whatever the exact dimensions of the compartment 18, it is constructed to slidably receive the computing device 12 from a compartment entrance 20 and to direct an electrical connector 22 of the device into contact with an electrical connector 24 of the bulkhead 16. Another electrical connector in the form of an IR transceiver 23 is adjacent to the connector 22. As will be described, its IR signal passes through openings in the bulkhead 16 to communicate with other devices. To retain the device 12, the compartment 18 includes a pair of longitudinal retaining ribs 26 on opposite compartment sidewalls 28a,b for engaging a gap defined between the device keyboard 30 and a hinged display 32. These ribs 26 prevent the device 12 from lifting out of the compartment, with the space between the sidewalls 28a,b sized to prevent lateral movement of the device therein.

Running longitudinally along the floor of the compartment 18 are a pair of elastomeric friction pads 34 for frictionally engaging the bottom surface of the computing device 12. The pads 34 prevent the device from freely sliding out of the compartment 12 and also aid in eliminating rattling by preventing lateral movement therein. As best seen in FIG. 5, each pad 34 includes a ramp portion 36 at the entrance end 20 which tucks the end of the pads beneath the lateral edge of entrance 20. These ramp portions 36 protect the pads 34 from being caught at their leading edges as a device 12 is slid along them into the compartment 18. The ramp portions 36, being farther from the retaining ribs 26 than the linear portion of the pads 34, also provide a wedging action to cause the pads to gradually increase the frictional force on the device as it is slidably inserted into the compartment 12.

The entrance 20 is open not only for enabling the computing device 12 to be slidably inserted within compartment 18, but for allowing access to a plug-in slot (not visible) in the computing device. This slot allows memory cards and other cards to be added to the computing device to increase its computing power. Access to this slot is thus quite important while the device 12 is retained within the compartment 18. The entrance 20 and its counterpart for the peripheral device also allow devices longer than the compartment length to be mounted within the respective compartments.

Adjacent to the bulkhead 16 but on its opposite side from the compartment 18 is a second compartment 38 for removably retaining the peripheral device 14. Like the compartment 18, the exact size and shape of the compartment 38 is dictated by the size and shape of the peripheral devices to be retained therein. The device 14 shown in FIG. 1A is actually half of the expected height of a peripheral device for the apparatus 10. But rather than increasing the size of the peripheral device unnecessarily, a spacer 40 may be provided for visually filling the gap left by a half-height device 14 mounted within the compartment. For full-height devices 14, the spacer 40 is not required. All devices 14, however, do have an electrical connector for contacting a second electrical connector 42 of the bulkhead 16, guided thereto by the shape of the compartment 38. To retain the peripheral device 14 within compartment 38, a latch 44, to be further described, is provided for engaging a lip on the device (not visible). Alternatively, elastomeric friction pads may be employed in place of the latch 44.

FIG. 2 shows the features of the retaining apparatus in more detail. In addition to the first connector 24 and second connector 42, the bulkhead 16 includes a power prong 46. The prong 46 has two conductive surfaces (shown more clearly in FIG. 5) separated by an insulating layer and is rigidly mounted to the bulkhead 16 for engaging a standard, circular AC connector 47 of the computing device 12 (FIG. 1B). The prong 46 is designed to provide external power to the device 12, if desired, while the device is retained within the compartment 18. As will be seen, the prong 46 is wired to a circular AC connector within the bulkhead which engages the standard adapter plug 48 of an AC adapter that is provided with the computing device 12.

Also visible in FIG. 2 are two of four molded depressions 50 for countersinking fasteners such as flat head screws into the floor of the apparatus 10 if desired. The other two depressions 50 are beneath the spacer 40 and thus are not visible. These depressions allow the apparatus 10 to be permanently mounted to a surface. To mount the apparatus, the user need only drill a starting hole at each of the depressions 50 and then screw or otherwise place an appropriate fastener therein. The depressions are shaped so that the fastener will not interfere with sliding devices into and out of the apparatus compartments 18 and 38.

FIGS. 3A and 3B are side views of the retaining apparatus 10, with the devices 12 and 14 shown therein by dashed lines. Consistent with the design of the apparatus, access to the card eject lever of the computing device 12 is provided through an opening 51 on the front side. On the rear side, an AC connector 49 that complements the adapter plug 48 is visible as well as third electrical connector 52 for connecting to another peripheral device (not shown) via an electrical cable 54. (FIG. 2). The third connector 52, like the second connector 42, is coupled within the bulkhead 16 to the first connector 24 that engages the computing device 12.

FIG. 4 is a cross-sectional view of the retaining apparatus taken at a point to show the mounting of the first and second connectors 24 and 42 for lateral movement within the bulkhead 16. Connector 24 mounts within the channel of a protrusion 56, held in place by a metal clip 58. The clip 58 includes a tab 60 and a lip 62 that together snap over a raised portion 64 of the protrusion 56 to prevent the connector 24 from moving forward or rearward within the channel. However, the channel is sized to permit the connector 24 to move laterally, both side to side and up and down. This lateral movement allows the connector 24 to self-align with the contacts of the complementary connector 22 of the computing device 12 without placing undue stress on the contacts and without the user needing to hand-connect the two connectors. The connector 42 is mounted in the same way, with the same numerals used to identify corresponding parts. Both connectors 24 and 42 in turn are wired to a circuit board 45 that controls their electrical interconnection.

FIG. 4 also illustrates a beveled portion 65 of the bulkhead adjacent to the compartment 18. The extra space provided by such beveling allows the user full use of the computing device keyboard 30.

FIG. 5 is a cross-sectional view of the retaining apparatus taken at a point to show more clearly the power prong 46 within the bulkhead 16. The prong 46 is rigidly but removably mounted within a slot 66 through the bulkhead to extend into the first compartment 18. As described, the prong has two conductive surfaces separated by an insulating layer (such as provided by a standard double-sided printed circuit board laminate) for connecting to the two conductors of the AC connector 47 of the computing device 12 (FIG. 1B). The prong is positioned to penetrate within the AC connector 47 between its inner conductor and outer conductor. With the prong 46 rigidly mounted in the proper position, the user can make a successful electrical connection by simply sliding the device 12 against the bulkhead 16. This design avoids the need to hand-connect the two connectors. The power prong 46 in turn is wired within the bulkhead 16 to the circular AC connector 49 for connection to the AC adapter plug 48 of the computing device's AC adapter.

FIG. 6 is a cross-sectional view of the retaining apparatus 10 taken at a point to show the removable mounting of the spacer 40 within the second compartment 38 of the apparatus. The spacer 40 includes a lip 70 that snaps into an opening within the bulkhead wall 72 to hold the spacer in place. To remove the spacer 40, the user presses against the supporting surface 74 of the spacer and slides the lip 70 free of the bulkhead wall 72.

FIG. 6 also shows openings 77a,b in the walls of the bulkhead 16 defining a path for IR signals to pass between the IR transceiver 23 of the device 12 and a peripheral device. In the illustrated embodiment, the IR signals are not intended for the peripheral device 14 (although they could be) but pass underneath it for communication with an external device such as another computing device, printer or the like. To permit the IR signals to pass through the space 40, it is made of a material that is transparent to IR radiation.

FIG. 7 is a cross-sectional view of the retaining apparatus 10 taken at a point to show the design of the latch 44 that retains the peripheral device 14 within the compartment 38. Latch 44 includes a lip 76 that snaps beneath a lip of the device 14 (not shown).

Alternatively, the lip 76 may engage the inside surface of a wall of a full-height peripheral device 14 (not shown) through an opening in the wall. The lip 76 is part of a piece that includes a button 78 and a shaft for housing a spring 80 that biases the lip into a latching position. By pressing on the button 78 and compressing the spring 80, the lip 76 is moved downward and the latch is released, allowing the device 14 to be removed from the compartment 38.

FIG. 8 is cross-sectional view of the retaining apparatus 10 taken at a point to show how the bulkhead 16 is removably mounted within the apparatus. The bulkhead includes on one end a lip 82 for engaging a notch 84 in the rear sidewall 28b. The bulkhead is secured in place by a screw 86 that threads within hole 88 defined in the bulkhead adjacent to the front sidewall 28a. This screw and latch arrangement allows the bulkhead to be easily inserted within the apparatus by flexing the sidewalls 28a,b but insures that flexing alone will not allow the bulkhead to break free. Even if the bulkhead momentarily disengages from the rear sidewall 28b at the latch between the lip 82 and notch 84, it is held in place by the screw 86 and is readily re-engaged by snapping the bulkhead back into place. The removability of the bulkhead 16 also allows different bulkheads to be installed for different sized and shaped devices while sharing a common enclosure. A different bulkhead may be used for additional mechanical and electrical functions.

Having illustrated and described the principles of the invention in a preferred embodiment, it should be apparent to those skilled in the art that the invention can be modified in arrangement and detail without departing from such principles. We claim all modifications coming within the spirit and scope of the following claims, which are not intended to be limited in coverage to the disclosed embodiment.

We claim:

1. An apparatus for retaining and electrically interconnecting a portable computing device and a peripheral device, comprising:
   a first compartment defined by a pair of sidewalls each having a retaining rib thereon, a floor and a lateral entrance for slidably retaining a portable computing device slid laterally through the entrance, the retaining ribs extending over a portion of the computing device to prevent the computing device from lifting out of the compartment;
   a second compartment also defined by a pair of sidewalls each having a retaining rib thereon, a floor and a lateral entrance for slidably retaining a peripheral device slid laterally through the entrance; and
   a connecting unit mounted between the sidewalls and separating the first and second compartments for electrically interconnecting a portable computing device within the first compartment with a peripheral device within the second compartment, the connecting unit including a first connector for electrically connecting the unit to the portable computing device as the portable computing device is slid laterally within the first compartment against the first connector and a second connector for electrically connecting the unit to the peripheral device as the peripheral device is slid laterally within the second compartment against the second connector.

2. The apparatus of claim 1 wherein a compartment includes an elastomeric friction pad for retaining a device therein.

3. The apparatus of claim 2 wherein the elastomeric pad runs longitudinally along the floor of the compartment, the pad including a ramp portion thereof at an entrance to the compartment to gradually increase the frictional force on the device as its is slidably inserted laterally into the compartment.

4. The apparatus of claim 1 wherein a compartment includes a latch for retaining a device therein.

5. The apparatus of claim 1 wherein the first compartment includes an opening constructed to allow access to a plug-in slot of a portable computing device retained within the compartment.

6. The apparatus of claim 1 wherein the connecting unit includes an opening constructed to allow a portable computing device having an IR transceiver to communicate through the connecting unit with another device while the portable computing device is retained within the first compartment.

7. The apparatus of claim 1 wherein the connecting unit includes a rigidly mounted power prong for engaging an AC connector on the protable computing device for providing external power to the portable computing device while it is retained within the first compartment.

8. The apparatus of claim 1 wherein the connecting unit includes a third connector for electrically connecting a portable computing device in the first compartment to a peripheral device outside the apparatus.

9. The apparatus of claim 1 wherein the connecting unit includes a connector mounted therein for movement, the movement allowing the connector to self-align for coupling to a complementary connector of a device retained within a compartment.

10. The apparatus of claim 1 wherein the first or second compartments include depressions for receiving a fastener to mount the apparatus to a surface.

11. The apparatus of claim 1 wherein the first compartment defines an opening for exposing the portable computing device for access while the device is connected to the connecting unit.

12. The apparatus of claim 1 wherein the second compartment defines an opening for exposing the peripheral device for access while the device is connected to the connecting unit.

13. The apparatus of claim 1 wherein the first compartment, connecting unit and second compartment are longitudinally aligned for compactness.

14. An apparatus for retaining and interconnecting a portable computing device and a peripheral device, comprising:
   a first compartment having sidewalls and a lateral entrance for slidably retaining a portable computing device slid laterally therein, the computing device having a connector therein;
   a second compartment substantially longitudinally aligned with the first compartment and having sidewalls and a lateral entrance for slidably retaining a peripheral device slid laterally therein, the peripheral device having a connector therein; and
   a connecting unit having a first connector and a second connector for interconnecting the portable computing device to the peripheral device, the connecting unit located between the compartments,
   the first connector positioned for connecting to the computing device connector as the computing device is slid laterally through the lateral entrance of the first compartment against the first connector and the second connector positioned for connecting to the peripheral device connector as the peripheral device is slid laterally through the lateral entrance of the second compartment against the second connector.

15. The apparatus of claim 14 including another connector of the connecting unit for connecting to the connector of a peripheral device outside the apparatus.

16. The apparatus of claim 14 wherein the first and second compartments comprise a single enclosure and the connecting unit is removably mounted within the enclosure between the compartments.

17. An apparatus, comprising:
   a portable computing device;
   a peripheral device for connection to the portable computing device; and
   a retaining device for rigidly retaining together the portable computing device and the peripheral device, the device comprising a pair of sidewalls, a floor and a connecting unit mounted between the sidewalls to define a first compartment having a lateral entrance on one side of the connecting unit for slidably retaining the computing device and a second compartment having a lateral entrance on an opposite side of the connecting unit for slidably retaining the peripheral device, the connecting unit including a first connector connecting to the computing device and a second connector connecting to the peripheral device as each device is slid laterally through the lateral entrance of its respective compartment against the first or second connectors.

18. The apparatus of claim 17 wherein the connecting unit of the retaining device includes a separate connector for electrically interconnecting a peripheral device outside the apparatus to the portable computing device.

* * * * *